US 6,859,014 B2

(12) United States Patent
Bohne et al.

(10) Patent No.: US 6,859,014 B2
(45) Date of Patent: Feb. 22, 2005

(54) METHOD FOR RAPID CHARGE CONTROL IN LITHIUM BATTERIES

(75) Inventors: William C. Bohne, Lawrenceville, GA (US); John E. Herrmann, Sugar Hill, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/322,263

(22) Filed: Dec. 17, 2002

(65) Prior Publication Data

US 2004/0113587 A1 Jun. 17, 2004

(51) Int. Cl.[7] ................................................. H02J 7/16
(52) U.S. Cl. ....................................................... 320/148
(58) Field of Search ................................. 320/148, 136, 320/135, 127, 134, 137

(56) References Cited

U.S. PATENT DOCUMENTS 6,124,700 A * 9/2000 Nagai et al. ................. 320/132
6,373,225 B1 * 4/2002 Haraguchi et al. .......... 320/122
6,492,792 B1 * 12/2002 Johnson, Jr. et al. ....... 320/136

* cited by examiner

Primary Examiner—Pia Tibbits
(74) Attorney, Agent, or Firm—Philip H. Burrus, IV

(57) ABSTRACT

This invention includes a method for charging lithium-based batteries. Battery type is identified by a charger by way of a third terminal. For nickel-based cells, the third terminal is coupled to a thermistor for sensing temperature. For lithium-based cells, the third terminal is coupled to the rechargeable cell disposed within the battery pack. If a nickel cell is identified, the cell is charged by conventional means. If a lithium cell is identified, the charger applies a full current until any serial elements disposed between the battery pack terminals and the cell reach a high impedance state. The charger then reduces the charging current to a low level for a predetermined time. After this time has elapsed, the charger then reapplies a high current. If the voltage across the serial elements remains low, charging continues. However, if the voltage across the serial elements exceeds a predetermined threshold, the charger then decrements the current by a predetermined amount.

7 Claims, 5 Drawing Sheets

METHOD FOR RAPID CHARGE CONTROL IN LITHIUM BATTERIES

BACKGROUND

Technical Field

This invention relates generally to chargers for rechargeable battery cells, and more specifically to chargers capable of identifying different battery cell chemistry types and charging the cells accordingly.

Background Art

The portable electronic devices of today rely upon rechargeable batteries for portability. Modern cellular phones, pagers, radios, compact disc players, MP3 players, laptop computers and the like all use rechargeable batteries. These rechargeable batteries are manufactured in many different chemistries, including Nickel Cadmium (NiCd), Nickel Metal Hydride (NiMH) and lithium based chemistries. Nickel based batteries offer higher peak currents, whereas lithium based batteries are generally lighter with higher energy densities.

Nickel and lithium based batteries must be charged differently due to their different chemical compositions. For example, battery chargers terminate the nickel charging cycle by measuring a change in temperature across time. Chargers terminate the lithium charging cycle, contrastingly, by simply measuring voltage. As both nickel and lithium are suitable for some applications, like cellular phones or radios, a charger must be able to identify between the two chemistries to charge the cells properly.

One prior art method of identifying battery chemistry is by way of a coding resistor. Such a resistor is taught in U.S. Pat. No. 4,006,396, entitled "Universal Battery Charging Apparatus", issued to Bogut, which is incorporated herein by reference for all purposes. In this method, different battery types are equipped with resistors having different resistance values. The charger senses the value resistor in the battery and determines the battery type by comparing the sensed resistance to resistances and associated battery types stored in a look-up table read from the charger's memory.

While this method of identification lets the charger know what type of cell is being charged, it does not tell the charger what type of circuitry is in the battery alongside the cell. While older batteries may have comprised a cell and a box, modern batteries include all types of electronic circuitry, including charging protection circuits, fuel gauging circuits, and microprocessors. One such battery 10 is shown in FIG. 1. This battery 10 is taught U.S. Pat. No. 5,539,299, entitled "Protection switch for a battery powered device", issued to Fernandez et al, incorporated herein by reference for all purposes.

As can be seen by looking at the battery 10, multiple elements, including a diode 19 and charging protection pass element 28, are coupled in series with the cells 16. If the cells 16 are lithium, and if the charger 12 tries to sense voltage (for charge termination) at the terminals 18,22, the voltage sensed will be inaccurate due to the voltages across the serial components 19,28. Further, some battery circuits—like that recited in copending application No. 10/185,095, filed Jun. 29, 2002, entitled "Thermally Limited Battery Protection and Charging Circuit", incorporated herein by reference for all purposes—include pass elements that are thermally triggered. If a thermal event triggers opening of the pass element, any voltage measurement at the battery terminals will be invalid.

There is thus a need for a charger with an improved identification means and charging termination method for lithium cells that is capable of properly terminating charge despite circuit elements that may be coupled serially with the cell.

DETAILED DESCRIPTION OF THE INVENTION

Figure 1:
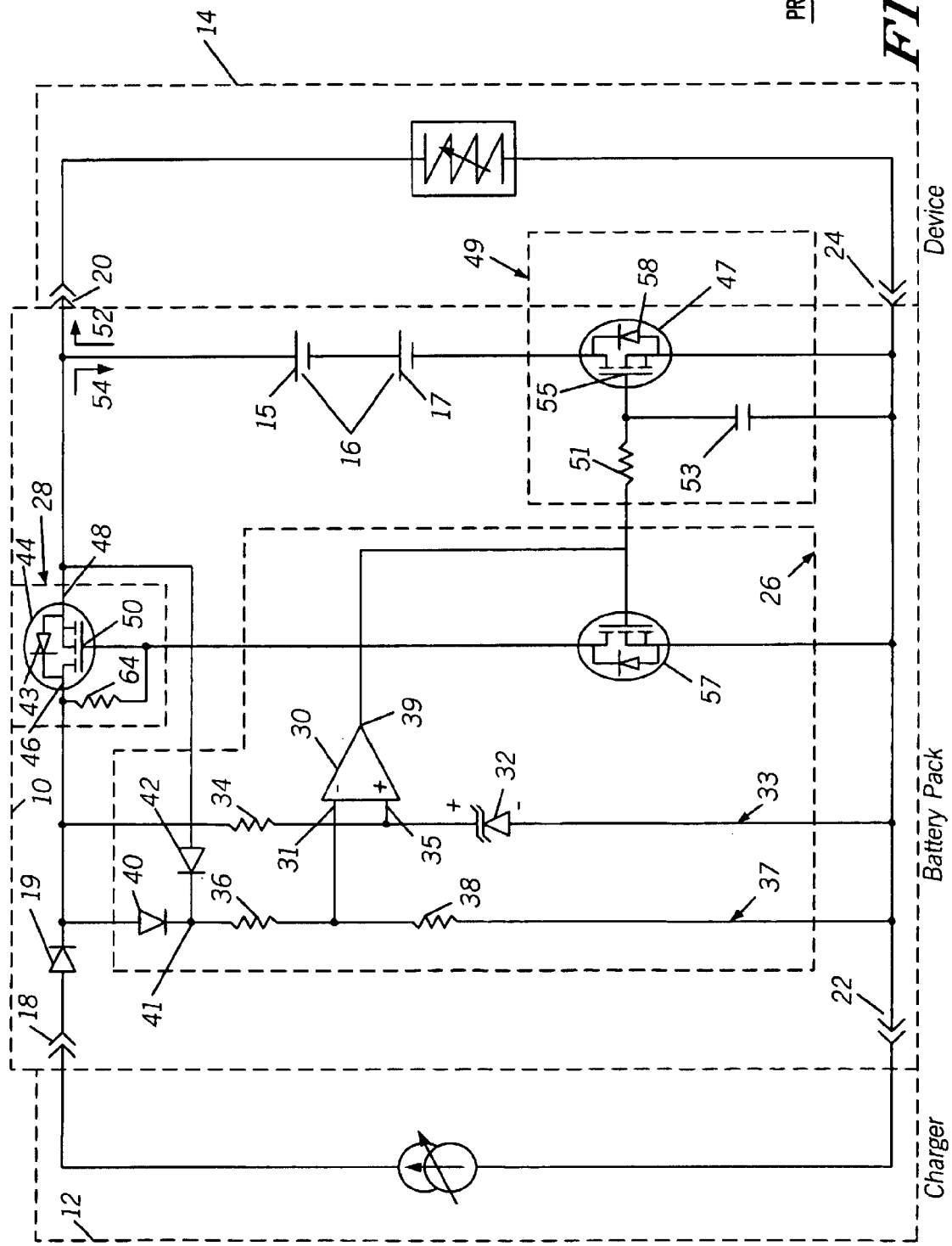
FIG. 1 illustrates a prior art battery circuit.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention provides a charger with a circuit capable of identifying the type Of cell to be charged. The charger then selects a charging termination method based upon the cell identification. Nickel based cells terminate charge as is known in the art, preferably by a change in temperature of the cell per change in time. The invention terminates charge in lithium cells in a novel manner that allows rapid charging despite the presence of circuit components coupled serially with the cell.

Figure 2:
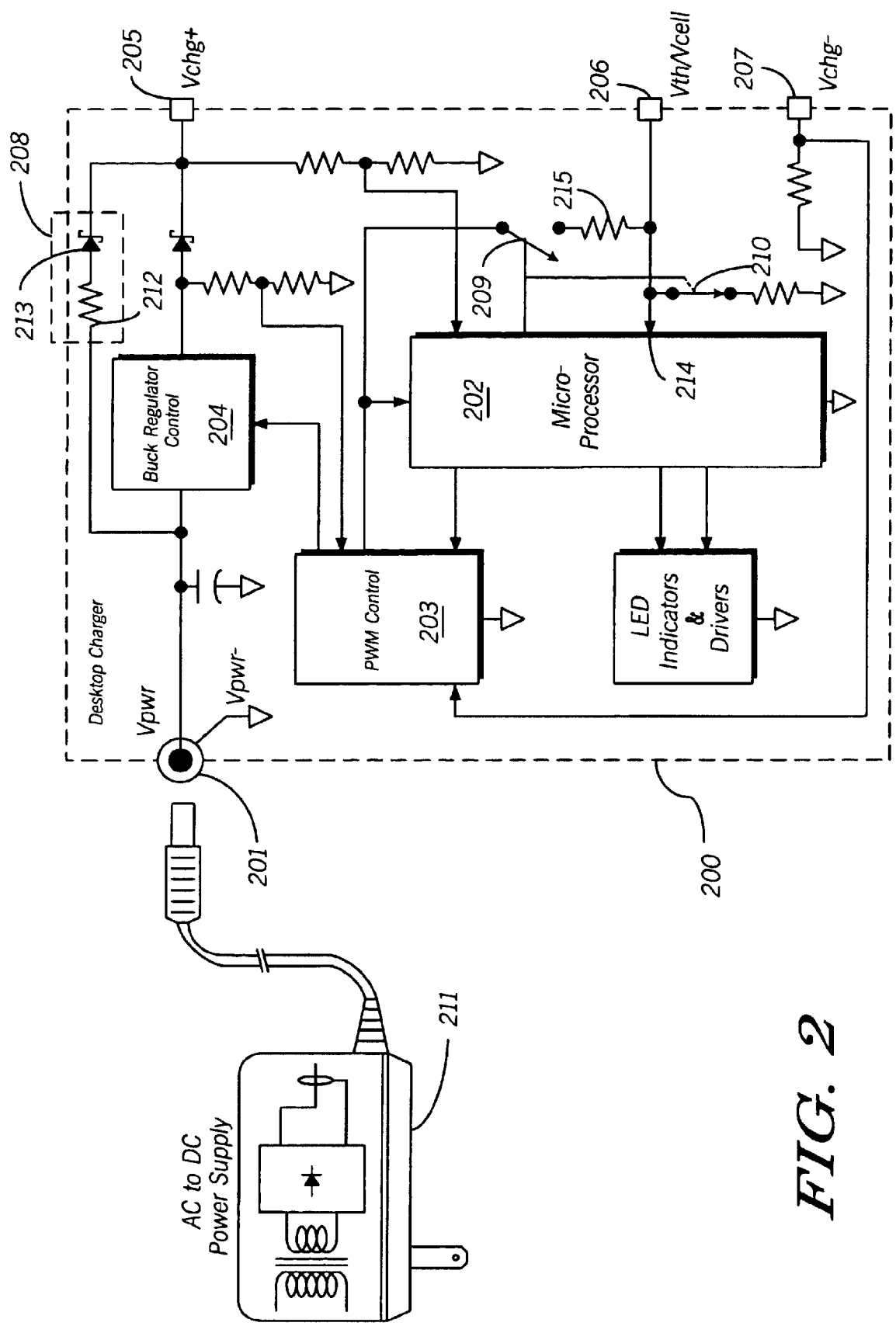
FIG. 2 illustrates the block diagram schematic of a charger in accordance with the invention.

Referring now to FIG. 2, illustrated therein is a preferred embodiment of a charger 200 in accordance with the invention. The charger 200 includes a microprocessor 202 having associated memory for storing cell identification data and charging methods. The microprocessor 202 acts as the "brain" of the charger 200, as the microprocessor 202 is dominant over the other circuit components.

The charger 200 also includes power circuitry for delivering current from a power supply 211 to a battery. The power circuitry includes a power conversion regulator 204. The power conversion regulator 204 converts voltage and current from levels produced by the power supply 211 to levels acceptable by the cells in the battery pack. For example, as power supplies 211 typically output voltages exceeding the voltage limits of a rechargeable cell, a preferred power conversion regulator 204 is a buck, or step-down, regulator to step the voltage down to a level that will not compromise the reliability of the cells. The power conversion regulator 204 is controlled by a pulse width modulated (PWM) control 203 that is subservient to the microprocessor 202. Through the power circuitry, current is delivered from a power supply input terminal 201, through the power conversion regulator 204 to a charging output terminal 205 that is coupled to the cell in the battery pack (not shown in FIG. 2). (The return path is through the return terminal 207.)

The charger 200 optionally provides a trickle charge circuit 208 to charge cells with voltages below the manufacturer's recommended limits. The trickle charge circuit 208 preferably includes a high impedance resistor 212 and blocking diode 213. The trickle charge circuit 208 provides just enough current to the cell as to bring it up to an acceptable rapid charge level. Once the cell reaches this level, the microprocessor 202 causes current to begin flowing through the power conversion regulator 204.

Figure 3:
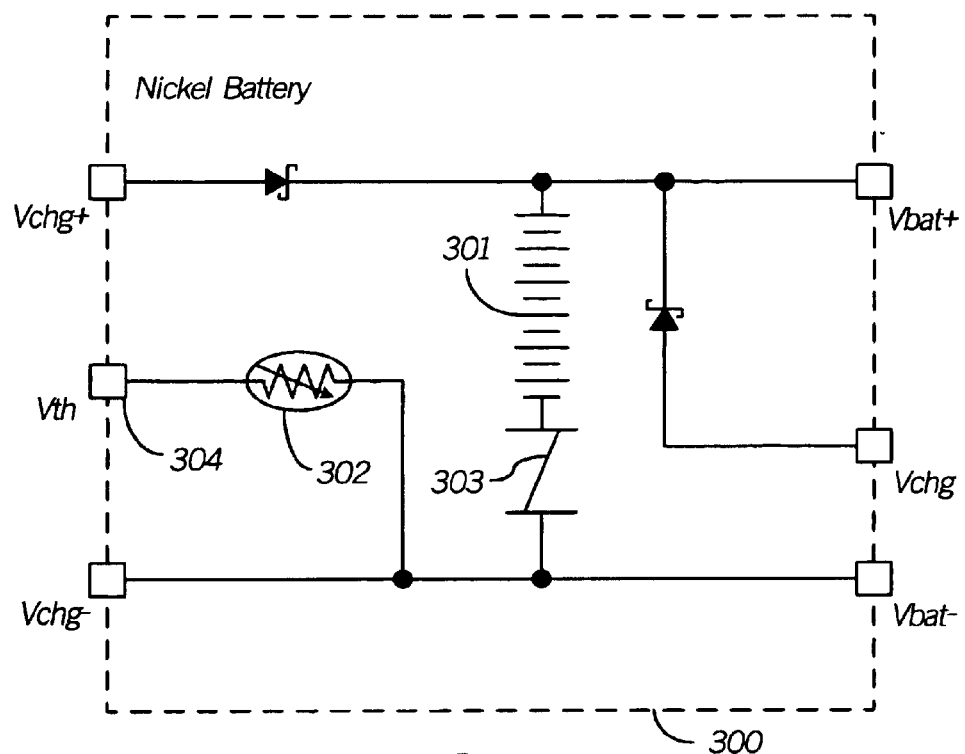
FIG. 3 illustrates a nickel-based battery in accordance with the invention.
Figure 4:
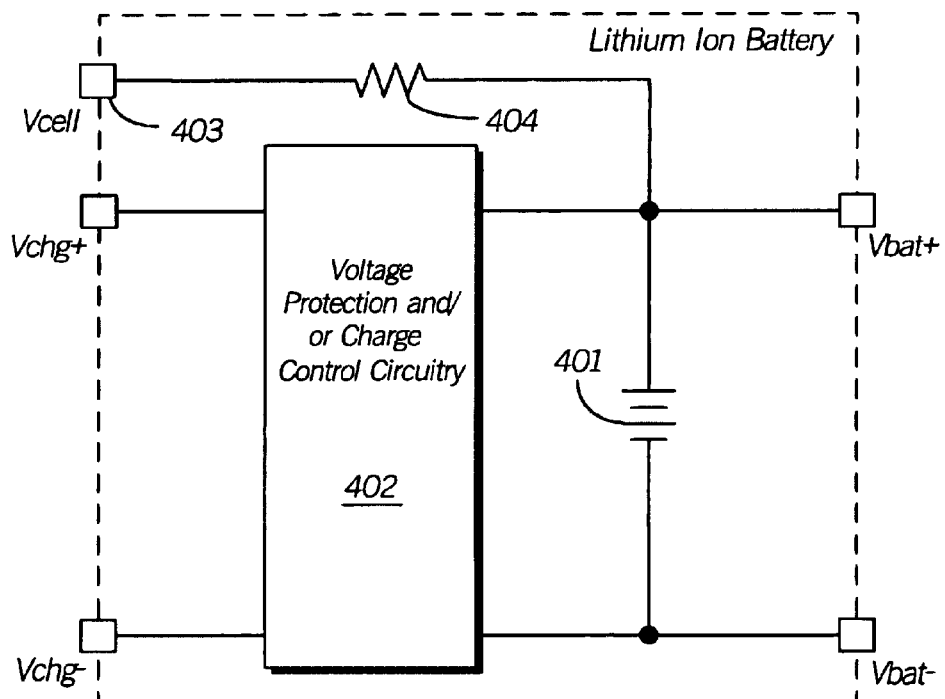
FIG. 4 illustrates a lithium-based battery in accordance with the invention.

Referring now to FIGS. 3 and 4, illustrated therein are two preferred batteries to be used in accordance with the invention. Referring to FIG. 3, a conventional nickel based battery 300 is shown. As stated above, chargers of nickel based batteries typically terminate charge by sensing temperature across time. Temperature is sensed by way of a thermistor 302. The thermistor is mechanically disposed in close proximity to the nickel cells 301. The thermistor 302 couples to the charger by way of a thermistor terminal 304. Overcurrent protection 303, preferably a positive temperature coefficient (PTC) resistor, is also provided.

Referring again to FIG. 2 when the battery (300 of FIG. 3) is coupled to the charger 200, the charging terminal 205 is coupled to the cell (301 of FIG. 3). The microprocessor 402 recognizes the cell voltage to be indicative of a battery coupled to the charger 200.

Once the charger 200 recognizes that a battery is present, the charger 200 identifies nickel based cells by way of a pair of switches 209,210. Switches 209,210 begin in their standby state, preferably with switch 209 open and switch 210 closed. With the thermistor terminal (304 of FIG. 3) is coupled to the identification input 206, the thermistor (302 of FIG. 3) is pulled to ground. The microprocessor 202 then identifies this battery as a nickel based battery. The microprocessor 202 then closes switch 209 while opening switch 210. If the battery (300 of FIG. 3) is nickel based, a thermistor (302 of FIG. 3) will have a non-negative resistance value. If the thermistor is present, pull-up resistor 215 will cause a voltage to be present at an analog to digital (A/D) converter input 214. Provided the voltage is within a predetermined range associated with nickel batteries, the microprocessor 202 knows that the battery is a nickel-based battery. The microprocessor 202 then charges the battery accordingly.

Referring now to FIG. 4, illustrated therein is a lithium-based battery 400 if) accordance with the invention. The lithium battery 300, like the nickel battery, includes a third terminal 403 for identification. The third terminal 403, however, is coupled directly to the lithium cell 401 by way of a high impedance resistor 404. The high impedance resistor 404 has a resistance value that is sufficiently high to prevent charging current from bypassing the safety circuit 402 en route to the cell 401.

Referring now again to FIG. 2, the charger 200 also identifies lithium based cells by way of switches 209,210. When the third terminal (403 of FIG. 4) is coupled to the identification input 206, the microprocessor 202, like with the nickel battery above, opens switch 209 while closing switch 210. Since the battery (400 of FIG. 4) is lithium based with the third terminal (403 of FIG. 4) coupled to the cell (401 of FIG. 4), a voltage is present at the high impedance A/D converter input 214. Since this voltage is riot ground (as would be the case with nickel batteries), the microprocessor 202 knows that the battery is a lithium-based battery. The microprocessor 202 opens switch 209. This ensures that the cell voltage is represented at the high impedance A/D input. The microprocessor 202 then charges per the method illustrated in FIG. 5. Note that as the microprocessor 202 has access to both (he voltage of the output terminal 205 and the cell voltage (by way of terminal 206), the microprocessor 202 can determine the voltage drop across the lithium protection circuit (shown as 402 in FIG. 4), regardless of what components that circuit may comprise.

Figure 5:
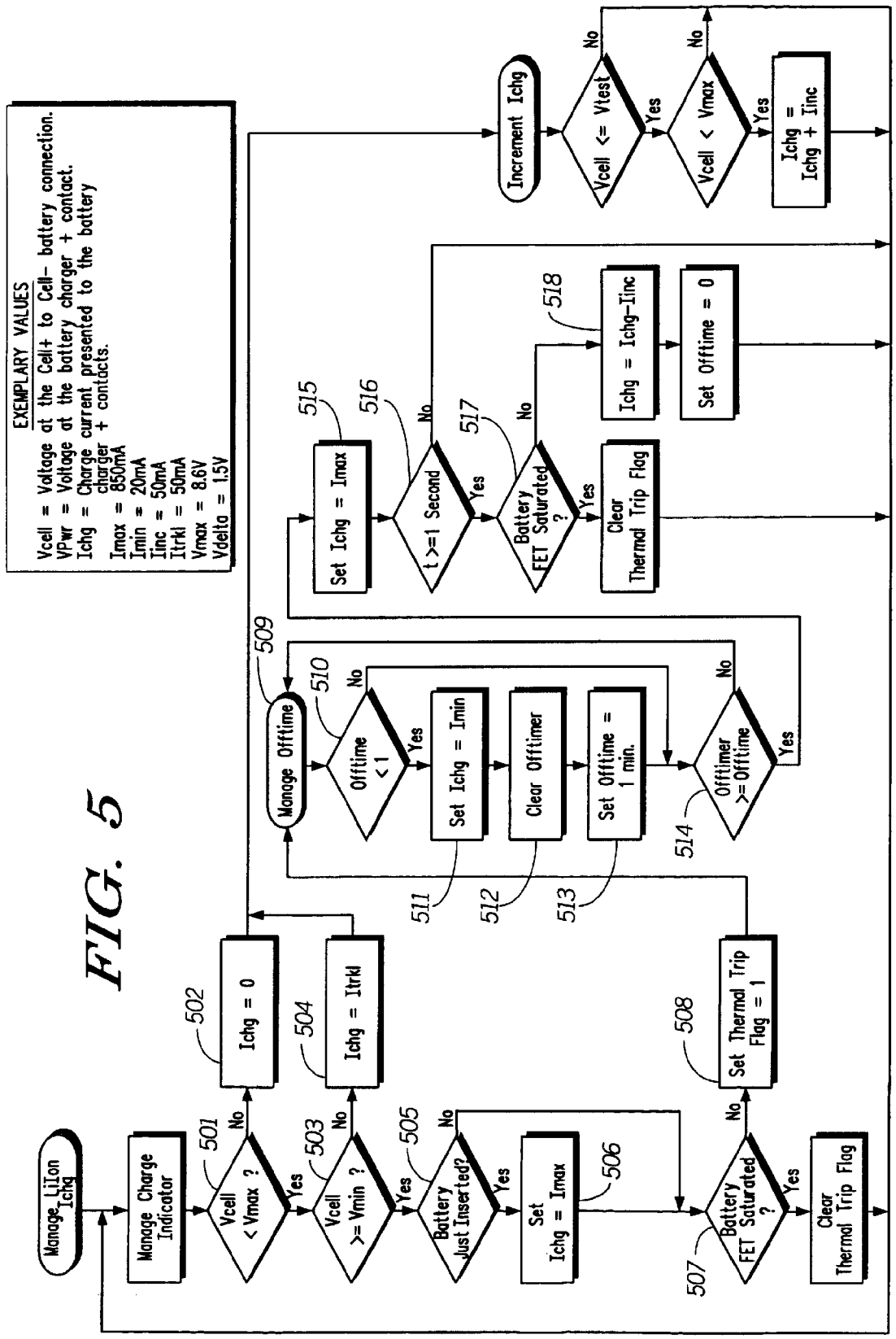
FIG. 5 illustrates a method of charging lithium-based batteries in accordance with the invention.

Referring now to FIG. 5, illustrated therein is a method of charging a lithium battery in accordance with the invention. The,method is employed by the microprocessor (202 of FIG. 2) once the microprocessor determines that it is coupled to a lithium battery. All steps performed are conducted by the microprocessor, which then directs the other charger components.

The battery is first checked to ensure that it is below the maximum threshold as step 501. For example, in a two-cell, serial combination, this may be 8.6 volts. If the cell is greater than this threshold, the charging current is terminated at step 502.

The cell is then checked to ensure that it is above a minimum threshold at step 503. Cell manufacturers generally recommend avoiding the application of a rapid charging current when the cell is below a threshold. For a single lithium cell, this voltage is generally around 2.3 volts. If the cell is below this threshold, a trickle current, preferably about 50 mA, is applied at step 504 in an attempt to slowly bring the cell to the minimum threshold voltage.

The microprocessor 202 then checks to see if this is the first time through the method at step 505. If this is the first time through, the charger sets the current to the maximum rate at step 506. The maximum rate is generally the capacity rate, which is on the order of 850 milliamps for a single cell (or a serial combination of single cells). If it is not the first time through, the charger holds the current constant.

The microprocessor 202 then checks to see if the elements (within the battery pack) coupled serially with the cell are saturated at step 507. Recall from the discussion above that the microprocessor 202 has access to the cell voltage through terminal 206, as well as to the power supply output at terminal 205. As the serial elements in lithium battery packs generally comprise transistors, the microprocessor 202 knows that the voltage across such an element will be small when the element is fully conducting. However, if there is some sort of limiting event, e.g. the pass transistor has become too hot, the impedance of, and corresponding voltage across, the serial element will increase rapidly. Thus, the microprocessor 202, at step 507, checks to see that the difference in voltage between terminal 205 and 206 is below a predetermined threshold. An exemplary value is 1.5 volts.

If the serial element is not saturated, then the microprocessor sets an event flag at step 508 and moves into the "manage off time" branch at point 509. From this point, the microprocessor 202 first checks to see if the off time (which is the amount of time that the current has been reduced) is less than a predetermined threshold, for example 1 minute. During the first pass through the manage off time branch, this time will be less than the predetermined threshold because the current will still be set to the maximum rate by way of step 506.

As the off time is less than the predetermined threshold, the microprocessor 202 reduces the current to a minimum value, like 20 milliamps for example. This reduction in current will allow whatever event caused the serial element to leave saturation to subside. For example, if the serial element was a transistor that was getting too hot, then the reduction in current will allow it to cool. The microprocessor 202 provides an adequate time for this to occur by ensuring that the off time timer is clear at step 512 and then initializing it to a predetermined time, say 1 minute, at step 513.

Once the predetermined time has passed, as at step 514, the microprocessor 202 then attempts to reapply the previous charging current at step 515. As the event causing the serial element to move out of saturation may still be present, the microprocessor 202 only does this for a short time, say 1 second, as is noted at step 516. After applying the charging current for this brief interval, the microprocessor 202 immediately checks the serial element again to see whether it is in saturation (step 517). If it is, the microprocessor 202 presumes that the event causing the serial element to move out of saturation is gone. If it is not, however, the microprocessor 202 then decrements the current by a predetermined amount, for example 50 mA, at step 518 and repeats the process. Charging is finally terminated with the microprocessor 202 decrements current below a predetermined threshold, like 200 mA.

The method also predicts when the battery is nearly fully charged. Note that the "trip flag", indicative of an event occurring that sends the serial element out of saturation, is set at step 508. When the current is decremented below the predetermined threshold, and the trip flag is set, the microprocessor 202 presumes this to correspond to a cell that is nearly fully charged, as the microprocessor 202 will have tried to restart the maximum current many times. Thus, when a predetermined current level is reached through microprocessor 202 decrementation, the microprocessor 202 will actuate an annunciator, like a LED for example, to indicate that the battery is nearly fully charged. By way of example, when a current level corresponding to 90% charge is reached, the microprocessor 202 may toggle an LED from red (indicating rapid charge) to flashing green (indicating approximately 90% full).

To recap by way of summary, the method charges a battery at a maximum current while sensing both the voltage at the battery terminal and at the cell. When an event occurs that causes the difference in voltage between the battery terminal and the cell to increase above a predetermined threshold, the method reduces the current to a minimum level for a predetermined time. After the predetermined time has elapsed, the method reinitiates maximum current. If the difference in voltage between the battery terminal and the cell remains small, then the method continues to charge at the high rate. If, however, the voltage between the battery terminal and the cell increase again, the method will decrement the charging current by a predetermined amount. The method repeats this process until the current has been decremented to a level indicative of full capacity.

Figure 6:
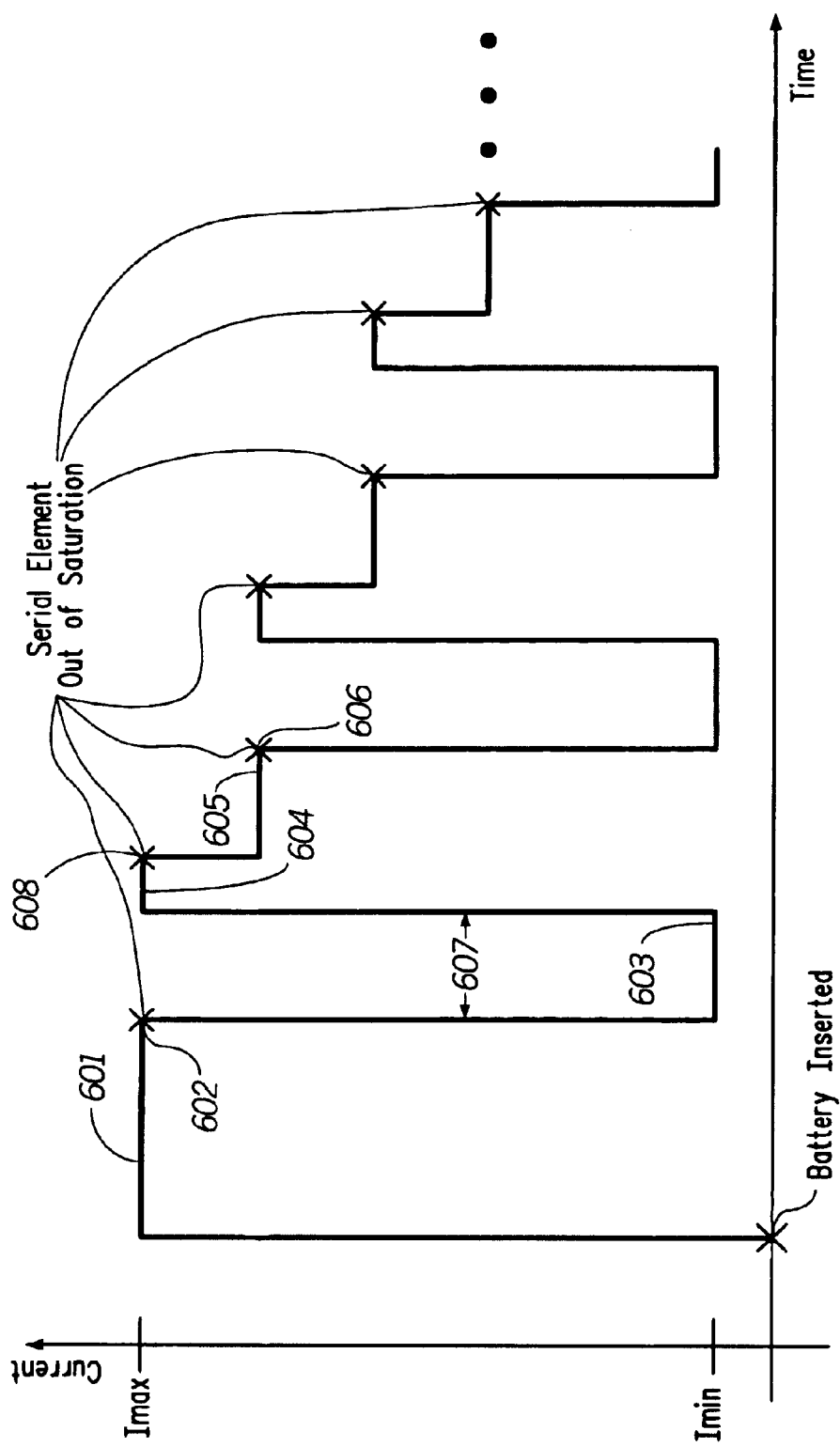
FIG. 6 is a graphical illustration of an exemplary charging current for lithium-based batteries in accordance with the invention.

To examine this graphically, please refer to FIG. 6. When the battery is inserted into the charger, the charger ramps the current up to the maximum charging current for the particular application. This is shown at segment 601. When a "trip" event (where the voltage drop across serial elements increases), such as point 602, the charger reduces the current to a minimum level at segment 603. After a predetermined time represented by 607 passes, the current is then ramped up to a high level (at segment 604) for a brief interval. If another trip event occurs (point 608), then the charger decrements current by a predetermined amount at segment 605. This charging current continues until another trip event occurs at point 606. The process repeats until a current level indicative of full charge is reached.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while thermal events have been discussed herein as exemplary ways that serial elements may be taken out of saturation, it will be clear to those of ordinary skill in the art that other events, including cells reaching a termination voltage, could also cause the impedance of serial elements to increase.

What is claimed is:

1. A method of charging a battery, the method comprising the steps of:

a. providing a battery having at least three terminals: a first terminal for receiving a charging current, a return terminal, and a third terminal coupled to a cathode of a rechargeable cell disposed within the battery;

b. applying a charging current having a first magnitude;

c. sensing a difference in voltage between the first terminal and the third terminal; and d. reducing the charging current to a second magnitude when the difference in voltage between the first terminal and the third terminal exceeds a predetermined threshold.

2. The method of claim 1, further comprising the step of holding the charging current at the second magnitude for a first predetermined time.

3. The method of claim 2, further comprising the step of applying a charging current of the first magnitude for a second predetermined time after the first predetermined time has elapsed.

4. The method of claim 3, further comprising the step of decrementing the current by a predetermined amount if the voltage between the first terminal and the third terminal exceeds the predetermined threshold during the second predetermined time.

5. The method of claim 4, further comprising the step of actuating an annunciator when the current has been decremented to a predetermined current level.

6. The method of claim 5, further comprising the step of terminating charging current when the voltage between the second and third terminals reaches a predetermined termination voltage.

7. The method of claim 6, further comprising the step of applying a minimum current when the voltage between the second and third terminals is below a predetermined minimum voltage.

\* \* \* \* \*